United States Patent Office 2,784,075
Patented Mar. 5, 1957

2,784,075

METHOD OF RECOVERING VANADIUM FROM LEACH LIQUORS

Lester C. Bauerle and Iver W. Nicholson, Salt Lake City, Utah, assignors to the United States of America as represented by the Secretary of the Interior No Drawing. Application June 5, 1952,
Serial No. 292,016

3 Claims. (Cl. 75—6)

(Granted under Title 35, U. S. Code (1952), sec. 266)

The invention described herein may be manufactured and used by or for the Government of the United States for governmental purposes without the payment to us of any royalty thereon in accordance with the provisions of the Act of April 30, 1928 (Ch. 460, 45 Stat. L. 467).

This invention relates to the production of vanadium oxide from phosphorus-containing ores of vanadium, and more particularly to an improved process for the production of vanadium red cake low in phosphorus from sulphuric acid leach solutions containing vanadium values and phosphorus compounds.

Heretofore, in the production of "red cake" from leach solutions containing vanadium values and sulphuric acid, red cake has been precipitated by heating and agitating the solution at temperatures between 90° and 95° C. whereby commercial red cake is produced. However, in the recovery of vanadium from ores high in phosphorus, much phosphorus is precipitated in the red cake and, consequently, is very detrimental in the subsequent production therefrom of vanadium-bearing steels or the like. Numerous expedients have been previously attempted in an effort to purify the red cake during its production. However, to our knowledge, none of the prior expedients has been as economical and satisfactory as the process now to be described.

This invention accordingly has for an object the production of oxides of vanadium, low in phosphorus and sulphur, from ores of vanadium containing also phosphorus compounds. Another object is the production of red cake by which is understood a complex hydrated polyacid mixture of vanadium compounds, generally given the chemical formula $Na_2H_2V_6O_{17}$, from sulphuric-acid vanadium-bearing solutions containing phosphorus, dissolved alumina, dissolved silica, and other impurities as produced in the ordinary acid treatment of phosphate-bearing vanadium ores. A further object is the production of red cake which is low in, or substantially free of, phosphorus compounds and which, when fused to black cake, will contain at least 85 percent vanadium oxide, not more than 0.01 percent $P_2O_5$, and not more than 0.01 percent sulphur. Other and further objects will be apparent or will appear hereinafter as the ensuing description proceeds.

The foregoing and related objects are accomplished in accordance with this invention which provides a process for the production of vanadium red cake low in phosphorus from pentavalent vanadium ore leach liquors containing also phosphorus and sulphuric acid, by adding lime to a final solution pH of about pH 8.0, separating the precipitate and to it adding aqueous sulphuric acid to a final solution pH between about pH 1.0 and pH 1.2, separating the resultant solution from the residue, incorporating alkali carbonate with the solution to a final pH of about 7.5, separating the vanadium-bearing solution from the precipitate, adding sulphuric acid to said solution to a solution pH between about 1.0 and 2.0, then heating and agitating the solution at 90° C. to 95° C. to precipitate red cake, then separating the red cake from the supernatant solution.

It is desirable to pretreat the vanadium-bearing solution with sufficient sodium chlorate, or other suitable strong oxidizing agent, to insure that the dissolved vanadium ions are in the pentavalent state, since the subsequent treatment steps are effective on pentavalent dissolved vanadium.

Following the recovery of the purified red cake, it is converted to black cake by heating to the fusion temperature, as is known to those skilled in the art of vanadium recovery from ores thereof. This accomplishes a dehydration of the red cake and, at the same time, drives off sulphur compounds which are undesired in the final product.

Suitable vanadium-bearing leach solutions for treatment in accordance with this invention include sulphuric acid solutions which may, and generally do, contain dissolved sulphur dioxide from the known ore extraction step. In general, these leach solutions contain a substantial proportion of dissolved phosphorus, silica, alumina, and may contain zinc and other metallic impurities.

The vanadium-bearing solution is first treated with an amount of sodium chlorate, or other strong oxidizing agent, sufficient to convert the dissolved vanadium to the pentavalent state. Obviously, the amount of sodium chlorate to be added depends upon the quantity of trivalent vanadium present and the quantity of other materials able to be oxidized. It has been found that about 50 percent by weight of sodium chlorate should be added, based upon the vanadium content of the solution. After incorporation of the sodium chlorate, the solution is heated to a temperature sufficiently high to insure the oxidation of all vanadium, while insufficient to precipitate red cake. A suitable temperature is between 70° and 85° C., preferably about 80° C. In place of sodium chlorate, other strong oxidizing agents may be employed such as, for example, potassium permanganate, potassium chlorate, hydrogen peroxide, ozone, or the like, the principal criteria being the cheapness of the oxidizing agent and the residual impurities introduced into the solution. Sodium chlorate represents a preferred oxidizing agent since it introduces no harmful impurities which might complicate the subsequent purification and, at the same time, under the conditions above stated, converts the vanadium to the pentavalent state.

Following the pretreatment with an oxidizing agent, as above described, the solution containing the vanadium phosphorus, alumina, silica, and other impurities, is treated with sufficient lime to bring the solution pH to about pH 8. During this neutralization, the sulphate content of the solution is precipitated as calcium sulphate, and substantially the whole of the vanadium content of the solution is precipitated together with the phosphorus and alumina content.

The resulting precipitate containing the vanadium and phosphorus values, as well as a large quantity of calcium sulphate, is then separated from the supernatant residual solution by any convenient means, such as decantation, filtration, or the like. The filtrate or supernatant solution is discarded and contains the soluble impurities. This step also serves a desirable concentration function, since a large volume of leach liquor is reduced to a relatively small volume of precipitate.

Following the lime precipitation step, the precipitate is treated with enough aqueous sulphuric acid, suitably of 10 percent strength, to yield a slurry having a final pH of about 1.0 to 1.2. The slurry is agitated with this sulphuric acid solution whereby the vanadium values thereof are redissolved together with some of the phosphorus values. Most of the silica and alumina remains in the insoluble calcium sulphate precipitate. The solution containing the vanadium values is then separated from the residual calcium sulphate precipitate in any suitable fashion, as by filtration, decantation, or the like. An alkali metal carbonate, such as potassium carbonate, lithium carbonate or, preferably, sodium carbonate is incorporated in the solution to a final pH of about 7.5. At this stage of the process, most of the phosphorus and a small proportion of the vanadium are thrown down as an insoluble precipitate, together with remaining aluminous and other impurities which might interfere with production of high-grade red cake. The precipitate from the sodium carbonate precipitation contains a sufficient quantity of vanadium so that, if desired, it is retreated with dilute sulphuric acid of about 10 percent concentration to a final pH of 1.0 to 1.2, whereby the vanadium values and some impurities are redissolved, and the resulting solution is separated from the residue. The residue is discarded and the solution is generally added to the final vanadium-bearing solution or precipitated red cake; however, it may optionally be returned to the initial solution being treated.

The final vanadium-bearing solution is suitable for precipitation of red cake having a very low phosphorus content. The precipitation of red cake is accomplished in the manner known to those skilled in the art. Generally, the solution is heated and agitated at a temperature between 90° C. and 95° C. until the vanadium values precipitate as red cake. The red cake is then separated, preferably after cooling, from the sulphuric acid solution and heated to its fusion temperature to produce black cake. Any suitable means for separating the red cake from the dilute sulphuric acid solution may be employed as, for example, filtration, decantation, or the like.

The following example illustrates the practice of this invention, but it is not to be limited thereto:

A leach solution containing 30 grams $V_2O_5$ and 28 grams $P_2O_5$ was treated by adding 92 grams CaO in the form of milk of lime and the pH was raised to about 8. The pH of the slurry was then lowered to about 1.2 by addition of 48 grams $H_2SO_4$ and then by adding 54 grams $Na_2CO_3$, the pH of the slurry was finally about 7.5. The slurry was filtered and the precipitates were repulped in water.

In order to recover the coprecipitated $V_2O_5$, 46 grams $H_2SO_4$ was added to the repulped precipitates until the pH of the slurry was lowered to about 1.2 and then 47 grams $Na_2CO_3$ was added to raise the pH to about 7.5. The slurry was filtered and the filtrate was combined with the filtrate obtained from the first treatment. The final purified solution contained 20 grams $V_2O_5$ and 0.2 gram $P_2O_5$ per liter. Addition of $H_2SO_4$ to pH of about 1.5 and agitation at 90° to 95° C. for about 4 hours resulted in precipitation of red cake, which, when fused to black cake, assayed 85 percent $V_2O_5$ and less than 0.01 percent $P_2O_5$ or sulphur.

It will be seen from the foregoing description and example that a simple and efficacious procedure has been provided for the production of high quality red cake from vanadium-bearing solutions containing phosphorus as an impurity. Each step in the procedure cooperates with the other steps to produce an economical and efficient result. For example, the initial oxidation serves to transform the vanadium into the pentavalent state whereby it is amenable to processing in accordance with the later steps.

The lime precipitation step serves the function of concentrating the vanadium values into small bulk, economizing on the more expensive alkaline metal carbonate agent thereafter employed in causing the removal of many impurities, including a portion of the phosphorus. The subsequent dissolution in dilute sulphuric acid and precipitation with alkaline metal carbonate requires proportions of reagents that are based upon vanadium content largely, whereby great economies are achieved.

Since many apparently widely different embodiments of this invention will occur to those skilled in the art, in the light of the teachings herein made, various changes will occur to one skilled in the art without departing from the spirit and scope of this invention.

What is claimed is:

1. In a process for the production of vanadium red cake low in phosphorus from vanadium ore containing phosphorus, involving the extraction of vanadium values from such an ore with sulphuric acid and precipitation of vanadium values as red cake by heating the acidic solution, the improvement which comprises the removal of impurities including phosphorus from the acidic vanadium solution by first treating the vanadium solution with an oxidizing agent to convert the dissolved vanadium to the pentavalent state, then adding sufficient lime to elevate the pH to about pH 8.0, separating a precipitate containing calcium sulphate, phosphorus and vanadium values from an impurity-bearing solution, then extracting the precipitate at a pH of about 1.0 to 1.2, with aqueous sulphuric acid to redissolve vanadium values with some phosphorus impurity, separating and discarding the impurity-containing calcium sulphate residue; then incorporating sodium carbonate in the resulting solution in an amount sufficient to yield a final solution pH of about pH 7.5 whereby phosphorus and aluminous impurities are precipitated with some vanadium values, separating the thus purified vanadium solution from the phosphorus-containing residue, incorporating $H_2SO_4$ with the solution to lower the pH to about 1.5, and heating and agitating the solution at about 90° C. to 95° C. until red cake is precipitated.

2. The process of claim 1, wherein the vanadium values of the sodium carbonate precipitate are recovered by retreating said precipitate with additional aqueous sulphuric acid and reprecitating with additional sodium carbonate, separating and discarding the residue, and returning the vanadium-bearing solution to the process as before.

3. A process for the production of vanadium oxide from a sulphuric acid solution containing pentavalent vanadium and dissolved phosphorus impurities which comprises adding lime to pH 8.0, separating the precipitate and to said precipitate adding aqueous sulphuric acid to a pH 1.0–1.2, separating the resulting solution from the residue, incorporating alkali metal carbonate with the solution to a final pH of about 7.5, separating the vanadium-bearing solution from the precipitate, adding sulphuric acid to a pH 1.0–2.0, then heating and agitating the solution at 90° C. to 95° C. to precipitate red cake, separating the red cake and heating the same to fusion to yield black cake containing at least 85 percent by weight vanadium oxide, not higher than 0.01 percent $P_2O_5$ and not higher than 0.01 percent sulphur.

References Cited in the file of this patent

UNITED STATES PATENTS

| | | |
|---|---|---|
| 787,758 | Herrenschmidt | Apr. 18, 1905 |
| 1,129,253 | Vogt | Feb. 23, 1915 |
| 1,430,864 | Thews | Oct. 3, 1922 |
| 1,596,483 | Frick | Aug. 17, 1926 |
| 1,621,038 | Thews | Mar. 15, 1927 |
| 1,747,403 | Tilley | Feb. 18, 1930 |
| 2,109,917 | Dunn | Mar. 1, 1938 |
| 2,168,169 | Meyer | Aug. 1, 1939 |
| 2,193,092 | Frick et al. | Mar. 12, 1940 |
| 2,320,661 | Schneider | June 1, 1943 |
| 2,357,488 | Nelson | Sept. 5, 1944 |

OTHER REFERENCES

Chemical and Metallurgical Engineering, vol. 20, No. 10, May 15, 1919. Pages 514–518. Article by Conley.

Bureau of Mines Report of Investigations, R. I. 3649, July 1942. Published by Bur. of Mines, Dept. of Interior, Wash., D. C., pages 29, 30 and 31 and two sheets of graphs between pages 30 and 31.